(12) United States Patent
Zondag

(10) Patent No.: US 10,381,780 B2
(45) Date of Patent: Aug. 13, 2019

(54) SYSTEM AND METHOD FOR MONITORING THE CONNECTION OF A PLUGGABLE LIGHTING UNIT TO A SOCKET

(71) Applicant: PHILIPS LIGHTING HOLDING B.V., Eindhoven (NL)

(72) Inventor: Eduard Gerhard Zondag, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/756,753

(22) PCT Filed: Aug. 19, 2016

(86) PCT No.: PCT/EP2016/069737
§ 371 (c)(1),
(2) Date: Mar. 1, 2018

(87) PCT Pub. No.: WO2017/036826
PCT Pub. Date: Mar. 9, 2017

(65) Prior Publication Data
US 2018/0254584 A1    Sep. 6, 2018

(30) Foreign Application Priority Data
Sep. 1, 2015 (EP) ..................................... 15183322

(51) Int. Cl.
*H01R 13/641* (2006.01)
*H05B 37/00* (2006.01)
*G08B 13/14* (2006.01)
*H01R 13/703* (2006.01)
*H05B 37/02* (2006.01)
*H01R 13/70* (2006.01)

(52) U.S. Cl.
CPC ....... *H01R 13/641* (2013.01); *G08B 13/1409* (2013.01); *H01R 13/703* (2013.01); *H05B 37/00* (2013.01); *H05B 37/02* (2013.01); *H01R 13/701* (2013.01)

(58) Field of Classification Search
CPC .. H01R 13/641; H01R 13/703; H01R 13/701; H05B 37/00; H05B 37/02; G08B 13/1409
See application file for complete search history.

(56) References Cited

U.S. PATENT DOCUMENTS

| 4,542,337 A | 9/1985 | Rausch |
| 4,588,949 A | 5/1986 | Becker et al. |
| 4,749,938 A | 6/1988 | Bishop |

(Continued)

FOREIGN PATENT DOCUMENTS

| CA | 2718616 A1 | 4/2011 |
| EP | 0932888 B1 | 6/2001 |

(Continued)

*Primary Examiner* — Leon Flores

(57) ABSTRACT

A socket (16) is designed to receive a plug of a pluggable device (14). The socket has a detection arrangement (42) for detecting connection of a plug to the socket. A new session identifier is generated each time a plug is connected to the socket and it remains valid while the plug remains attached. The session identifier is preferably generated mechanically (48) so that it can be generated without power to the socket or to the plug. This enables detection of system tampering of a system using the sockets.

10 Claims, 2 Drawing Sheets

(56) References Cited

U.S. PATENT DOCUMENTS

| | | |
|---|---|---|
| 4,833,455 A | 5/1989 | Bishop |
| 5,689,243 A | 11/1997 | Bianco |
| 5,818,338 A | 10/1998 | Ferraro |
| 2009/0044964 A1 | 2/2009 | Schoettle |
| 2011/0015795 A1 | 1/2011 | Boyer et al. |
| 2011/0199095 A1* | 8/2011 | Pfeiffer ................ H01R 13/641 324/600 |
| 2014/0159864 A1 | 6/2014 | Allen et al. |

FOREIGN PATENT DOCUMENTS

| | | |
|---|---|---|
| EP | 1314142 B1 | 4/2005 |
| WO | 2007072581 A1 | 6/2007 |
| WO | 2007074541 A1 | 7/2007 |
| WO | 2013042108 A1 | 3/2013 |
| WO | 2015039980 A1 | 3/2015 |

* cited by examiner

SYSTEM AND METHOD FOR MONITORING THE CONNECTION OF A PLUGGABLE LIGHTING UNIT TO A SOCKET

CROSS-REFERENCE TO PRIOR APPLICATIONS

This application is the U.S. National Phase application under 35 U.S.C. § 371 of International Application No. PCT/EP2016/069737, filed on Aug. 19, 2016 which claims the benefit of European Patent Application No. 15183322.5, filed on Sep. 1, 2015. These applications are hereby incorporated by reference herein.

FIELD OF THE INVENTION

This invention relates to a system and method for monitoring connection of a plug to a socket, in particular for security reasons.

BACKGROUND OF THE INVENTION

Security is an increasingly important requirement for many applications, not only software applications, but also when involving physical objects.

For example, a network of devices may have multiple devices, each connected to a system socket. The network configuration may be set by a professional installer, and it may then be desired to ensure that changes are not made to the network without the knowledge or approval of the professional installer or system maintainer. An example is the professional lighting domain. In such a system, it may be desirable to prevent someone inserting, removing or changing a lamp or sensor in a luminaire socket without notice. There can be a variety of risks, such as:

the lighting properties in a room no longer comply with regulations or agreed health conditions for people working in the room;

safety regulations for installing objects in a building may be violated. This can be a large issue for calibrated sensors or other objects;

there can be undesired tampering with the inserted object or its replacement, such as added eavesdropping facilities (e.g., stealth audio or video recording).

Objects of various types can be installed in sockets of various types. Applications, regulations and risks in healthcare or lifestyle domains may also depend on increased control over the plugging in of correct objects to sockets. These objects may be electronic devices, physical objects (such as keys or tokens) or they may be cables attached to other devices or objects.

It is known for a socket to read an identifier of a device which is plugged in to the socket, either to identify the specific device or to recognize the type of device. However, this does not detect unplugging and plugging in of the same device, particularly if there is no power supplied to the device during this time.

There is therefore a need for a system which can detect connection and disconnection of a plug to a socket so that actions can be authenticated.

SUMMARY OF THE INVENTION

The invention is defined by the claims.

According to examples in accordance with an aspect of the invention, there is provided a system for monitoring the connection of a plug of a lighting unit to a socket, the system comprising a lighting controller adapted to store and/or monitor a session identifier to enable determination that the plug has been unplugged from the socket. The socket, for receiving a plug of a pluggable device, comprising:

a detection arrangement for detecting connection of a plug to the socket, wherein the detection arrangement is adapted to generate a session identifier which identifies the session during which the plug remains connected to the socket, wherein the detection arrangement is adapted to generate a new session identifier each time a plug is connected to the socket.

This socket generates a session identifier which identifies a period during which a plug (and therefore a device) remains plugged in to the socket. In this way, any tampering of the configuration of a system which includes the socket, by unplugging and/or plugging in a device, can be detected. In this way, it can be ensured that any installation or maintenance operations to such a system have been authenticated. The session identifier may be generated in a simple manner.

The plug may be at the end of a cable or an extension element, or the plug may have a device which is incorporated into the plug housing. Thus, the pluggable device may be as simple as a connecting cable or extension cable, or it may be an electronic or other physical device or system.

The session identifier may for example be absent (or have a specific value) if there is no device plugged in to the socket, so that an unplugged state may be detected. If a device is unplugged and then plugged in again, a new session identifier will be recognized.

Each new session identifier is preferably different, or at least the probability of two subsequently generated session identifiers being the same is low. The session identifier may be generated by an essentially random process, which does not actually exclude identical session identifiers being generated.

The system allows authenticated installation of pluggable devices or components (e.g., lamps, medical aids, cables) in compliant sockets (e.g., luminaires, power outlets, connectors). The system can detect if no plug is present in a socket (caused by accident, tampering, theft, etc.), or when a plug is (re)inserted in a socket.

The socket may be a power socket, and the session identifier remains valid with or without power provided to the socket.

In this way, even if a device has been unplugged with no power to the device, the socket or any part of the circuitry, the act of unplugging and plugging in again (or plugging in a different device) will give rise to a new session identifier.

The session identifier will thus be generated and or stored in such a way that no energy is used. This can be done both mechanically and electrically. In order to do this electronically, an energy harvesting device might be necessary as well as a non-volatile storage medium (EEPROM, flash). Examples of mechanical implementations are given below.

The session identifier may comprise an analogue parameter value, which value is generated by the mechanical operation of connecting the plug to the socket and which value remains stable during the time the plug is connected to the socket.

This means the generation of the session identifier does not require any power to the device. Instead, it acts as a mechanical recording of the action of plugging in the device.

The session identifier may comprise a variable impedance, wherein the impedance is varied by mechanical movement of one or more components of the detection arrangement in response to connection or disconnection of a plug to or from the socket.

Various different variable impedances may be used, such as capacitance or resistance. The mechanical movement of the plugging action is converted into a new impedance value. At the end of the plugging action, a stable session identifier will result; the type or duration of movements, including the preceding unplugging action, may have an effect on the generated identifier.

The detection arrangement may comprise a rotatable disc having different resistances between the center and different circumferential positions around the disc, wherein connection of a plug to the socket causes the disc to rotate and then be locked in position, and the session identifier comprises a resistance which includes one of the different resistances.

This provides one way to implement a variable resistance. The position of the disc can be designed to be random or pseudo random in response to the inevitable variation in the speed and/or pressure at which the plugging action takes place. The session identifier only needs to be unique in that a repeated value becomes statistically sufficiently unlikely in two subsequent sessions.

When the plug is not connected to the socket, the session identifier may have a value different to any possible value when the plug is connected to the socket.

This enables a socket with no plugged in device to be detected. For example, an electrical circuit may be broken when no device is plugged in, giving an infinite resistance (and therefore zero RC charging time for a variable capacitance).

The socket may comprise a control pin which sits in a recess, and is spring-biased such that it projects from a base of the socket when a plug is disconnected from the socket, and is pushed into a recessed state when covered by the plug.

It should not be possible to tamper with the pin, for example to hold it in while removing the plug. The recess preferably has an edge all around so that tampering becomes difficult.

The lighting controller adapted to store and/or monitor the session identifier to enable determination that the plug has been unplugged from the socket.

By monitoring the session identifier of the, or each, socket, it is possible to detect any changes in the system configuration, and then to determine if such changes are authenticated or not.

The lighting controller is for example additionally adapted to control the supply of power to the socket.

There may be a plurality of sockets, each having a unique identifier and wherein optionally there is a plurality of lighting controllers, each having a unique identifier.

By giving the sockets identifiers, it becomes possible to store information about the system configuration when the system is installed or commissioned. The pluggable devices may also have identifiers, or else just an identifier for the type of device (out of a set of possible devices) rather than an individual unique identification. Thus, it is possible to store which types of devices have been installed to which sockets within the system. There may be multiple lighting controllers within an overall larger system, and if so, they may also have individual identifiers.

The system may further comprise a system controller, which is adapted to store, for each connection of a plug to a socket within the system:
the unique identifier of the socket;
optionally, a unique identifier of the lighting controller; and
the session identifier.

This information enables the system configuration to be stored.

The system controller may be further adapted to generate a connection identification which is a function of the unique identifier of the socket, optionally the unique identifier of the controller, and the session identifier.

This connection identification may be used as an encryption key, for example for secure communication with a plugged in device. Other data, such as the session identifier, may also be used as an encryption key.

The system enables authenticated installation and commissioning operations to be ensured. The system may also include the pluggable devices themselves, i.e. in this example the lighting units. A lighting controller may be used for controlling other properties of the lighting units, not only the supply of power. It may control the light output color, intensity and evolution of lighting effects over time. It may also control components or functions used alongside lighting components, such as sensors.

According to examples in accordance with an aspect of the invention, there is provided a plug of a pluggable device for inserting in a socket, comprising:
a detection arrangement for detecting connection of the plug to the socket, wherein the detection arrangement is adapted to generate a session identifier which identifies the session during which the plug remains connected to the socket,
wherein the detection arrangement is adapted to generate a new session identifier each time the plug is connected to a socket.

The plug generates a session identifier which identifies a period during which the plug (and therefore a device) remains plugged in to a socket. In this way, any tampering of the configuration of a system which includes the plug, by unplugging and/or plugging in the plug in a (different) socket, can be detected. In this way, it can be ensured that any installation or maintenance operations to such a system have been authenticated. The session identifier may be generated in a simple manner.

It will be clear to even those of ordinary skill that several mechanisms as presented herein above for a socket according to the present invention may be applied with equal effect to a plug according to the present invention which in turn may be used in combination with either a conventional socket or a socket in accordance with the invention. In several embodiments the session identifier remains valid with or without power provided to the socket. In this way, even if a device has been unplugged with no power to the device, the plug or any part of the circuitry, the act of unplugging and plugging in again (or plugging in a different socket) will give rise to a new session identifier.

The plug may comprise a control pin which sits in a recess, and is spring-biased such that it projects from a base of the socket when a plug is disconnected from the socket, and is pushed into a recessed state when inserted in the socket.

It should not be possible to tamper with the pin, for example to hold it in while removing the plug.

The invention also provides a system for monitoring the connection of a plug of a pluggable device to a socket, the system comprising:
at least one plug as defined above; and
a plug controller adapted to store and/or monitor the session identifier to enable determination that the plug has been unplugged from the socket.

By monitoring the session identifier of the, or each, plug, it is possible to detect any changes in the system configuration, and then to determine if such changes are authenticated or not.

The plug controller is for example additionally adapted to a status or a property of the device connected to the plug.

There may be a plurality of plugs, each having a unique identifier and wherein optionally there is a plurality of plug controllers, each having a unique identifier.

The system may further comprise a system controller and the system may comprise a lighting system. Embodiments and example are described above for a system comprising the socket for receiving a plug of a pluggable device and can be applied analogously to the system comprising the plug of the pluggable device for inserting in a socket.

The invention also provides a method of monitoring the connection of a plug of a pluggable device to a socket, the method comprising:

in response to connection of a plug to the socket, generating a session identifier which identifies the session during which the plug remains connected to the socket, wherein a new session identifier is generated each time a plug is connected to the socket; and monitoring the session identifier to determine when the plug has been unplugged from the socket.

The method may comprise generating, as the session identifier, an analogue parameter value by the mechanical operation of connecting the plug to the socket, such as a variable impedance for example a variable resistance.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a socket for receiving a plug of a pluggable device and a plug of a pluggable device for inserting in a socket. The socket and plug have a detection arrangement for detecting connection of the plug to the socket. A new session identifier is generated each time a plug is connected to the socket and it remains valid while the plug remains attached. The session identifier is preferably generated mechanically so that it can be generated without power to the socket or to the plug. This enables detection of system tampering of a system using the sockets.

The detailed description focuses on the socket for receiving a plug of a pluggable device. When it is not explicitly mentioned and when it is not obvious from the context, all embodiments and examples can be applied analogously to the plug of the pluggable device for inserting in a socket.

Figure 1:
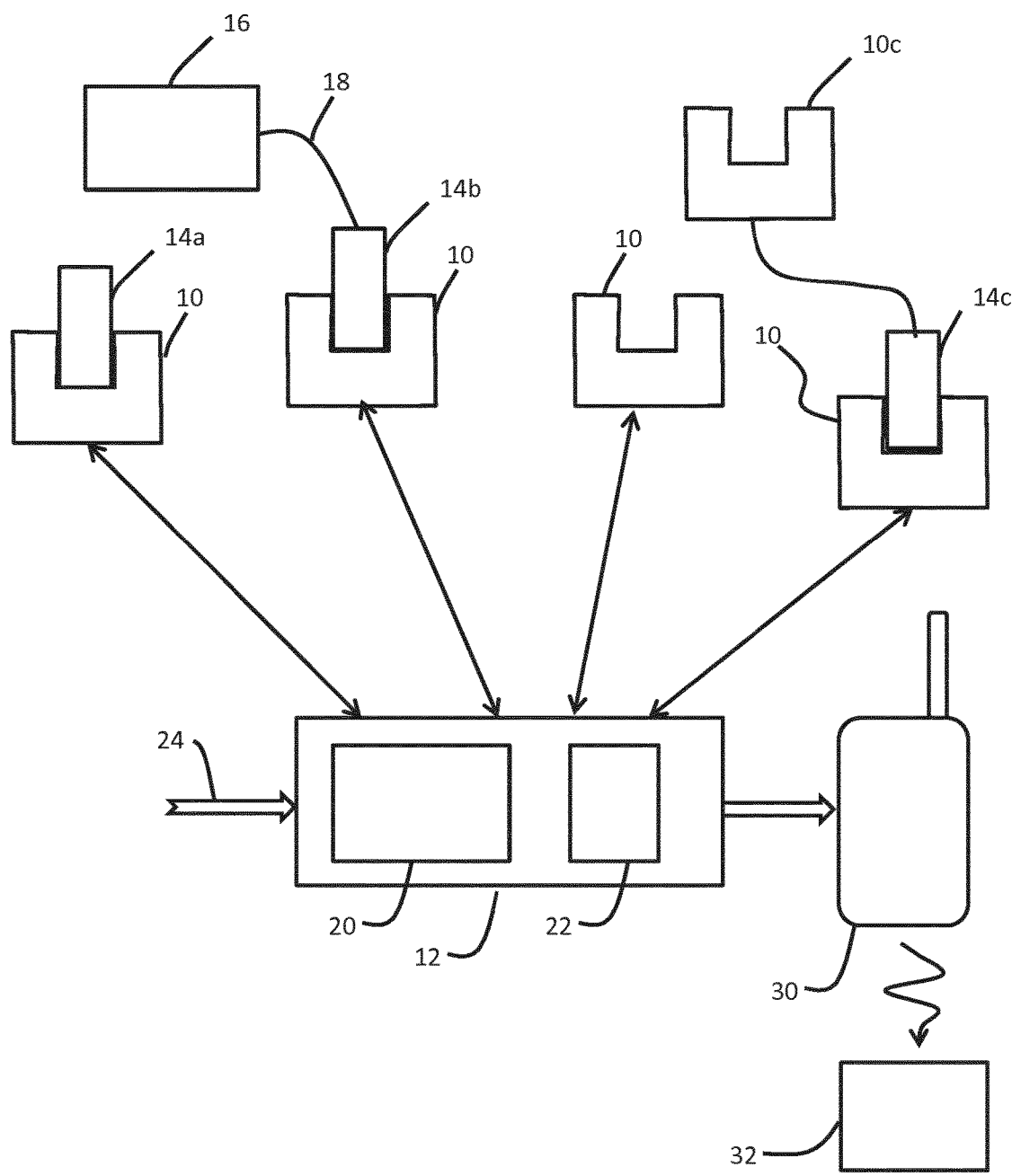
FIG. 1 shows a system in accordance with an example of the invention.

FIG. 1 shows a system which makes use of sockets which are designed in accordance with the invention.

The system comprises a set of sockets 10 and a socket controller 12. A set of pluggable devices is connected to the sockets to define an overall system configuration. The pluggable devices may be of various types. One example is a plug 14a which incorporates within the plug an electronic circuit such as a sensor. Another example is a plug 14b which connects to a device 16 over a lead 18. The device 16 may be any device, such as a luminaire or medical equipment. A further example is a plug 14c of an extension lead which has another socket 10c at the other end. As shown, some sockets may have no connected plug in the installed network.

The sockets 10 generate a session identifier each time a plug is plugged in.

The socket controller 12 is able to store and/or monitor the session identifiers to enable determination that a plug has been unplugged from its associated socket. The socket controller has a processor 20 and a memory 22.

The socket controller 12 is, in this example, electrically connected to each socket 10. The connection may be used to supply power from the socket controller to the sockets, and the socket controller receives external power 24 such as a mains input. The socket controller is able to read the session identifiers from the sockets. This may consist of reading a value from a socket, or it may involve sending an interrogation message to a socket and reading a reply. This interrogation message may be sent over the power supply line or else a separate data line or pair of data lines between the socket controller and each socket may be provided. For a system comprising a set of plugs and a plug controller, the plug controller may be connected to each plug wirelessly. For example using 802.11, 802.15.4 or any other suitable wireless network.

As will be explained below, one implementation of the session identifier is an impedance value. A test signal (functioning as an interrogation) can then be an electrical signal with a set voltage or current, and the reply is another electrical signal with a voltage or current level which encodes the session identifier. This can be a passive system with no need for complex communication protocols, although more complex approaches are also possible.

By monitoring the session identifier of each socket, it is possible to detect any changes in the system configuration, and then to determine if such changes are authenticated or not.

Each socket 10 may also have a unique identifier and there may also be a plurality of socket controllers 12, each having a unique identifier, each responsible for a sub-set of the sockets.

By giving the sockets identifiers, it becomes possible to store information about the system configuration when the system is installed or commissioned. The pluggable devices may also have identifiers, or else just an identifier for the type of device (out of a set of possible devices) rather than an individual unique identification. Thus, it is possible to store which types of devices have been installed to which sockets within the system.

The socket identifier may be public (rather than secret), and it is an identification at least unique in the context of the socket controller. The socket identifier may be implemented as a barcode or an RFID tag. It may give location based identification of the socket.

Each pluggable device may also have a public identifier, which is an identification of the object instance or the object type (for example with all identifiers the same for a specific type of device, such as a specific lamp design). The pluggable device identifiers may also be implemented as a barcode, an RFID tag or coded light for a luminaire.

There may be different designs of plug and socket so that plug-socket matching constraints can also make the identifier of the pluggable device implicit (implied by the socket type), so that it does not need to be recorded.

The socket controller 12 controls the sockets, such as power on/off and status retrieval functionality. The controller 12 may for example be operated and/or powered from a network router through Power over Ethernet.

During installation of the system, for a professional system, a suitably qualified installer plugs each device into a socket, and executes an authentication protocol. The installer may for example have a certified installer identification. An authenticated installer has an associated certificate that can be made available through some means (e.g., coded into an installation client with password protection).

As part of the authentication of an installation, such an installation client 30 (such as a smartphone or tablet) can record and send the following data to an installation server 32 (which functions as an overall system controller):
 the installer identifier;
 the socket identifier;
 (optionally) the pluggable device identifier.

The installation server 32 manages the installation process and stores the data for each session. This data may include the installer identifier, the socket controller identifier (maybe only if there is more than one), the socket identifier and the session identifier. The pluggable device identifier may also be provided. In this way, the system installation and configuration is monitored and authenticated. The system controller may further generate a connection identification which is a function of the unique identifier of the socket, optionally the unique identifier of the controller, and the session identifier (called "JoinID" below).

The installation server 32 may additionally store all relevant properties related to the elements associated with the various identifiers, and exercise control according to commands and properties of the elements.

This authentication can be applied to installation or commissioning functions.

As mentioned above, the installation server 32 may use the session identifier to construct a unique connection identifier, "JoinID", which is an identification of the joined pluggable device and socket. In its simplest form the JoinID is a function of the other identifiers, for example using a cryptographic hash function:

JoinID=$f$(controller identifier, socket identifier, session identifier)

The JoinID and any derived security codes can be used to securely track and control installed objects in the network or system. In case secure communication to a pluggable device is required, encryption keys may be generated by using the JoinID and/or the session identifier as a seed. The session identifier may only be recorded in the socket controller and/or installation server (kept as a secret). The JoinID may be public information.

As outlined above, the socket generates a new session identifier, which is a random or near random value, each time a plug is inserted in the matching socket, and this identifier remains static for the duration of the plug session. The session identifier is maintained without the need for continuous electric power being available during the session.

Figures 2A, 2B:
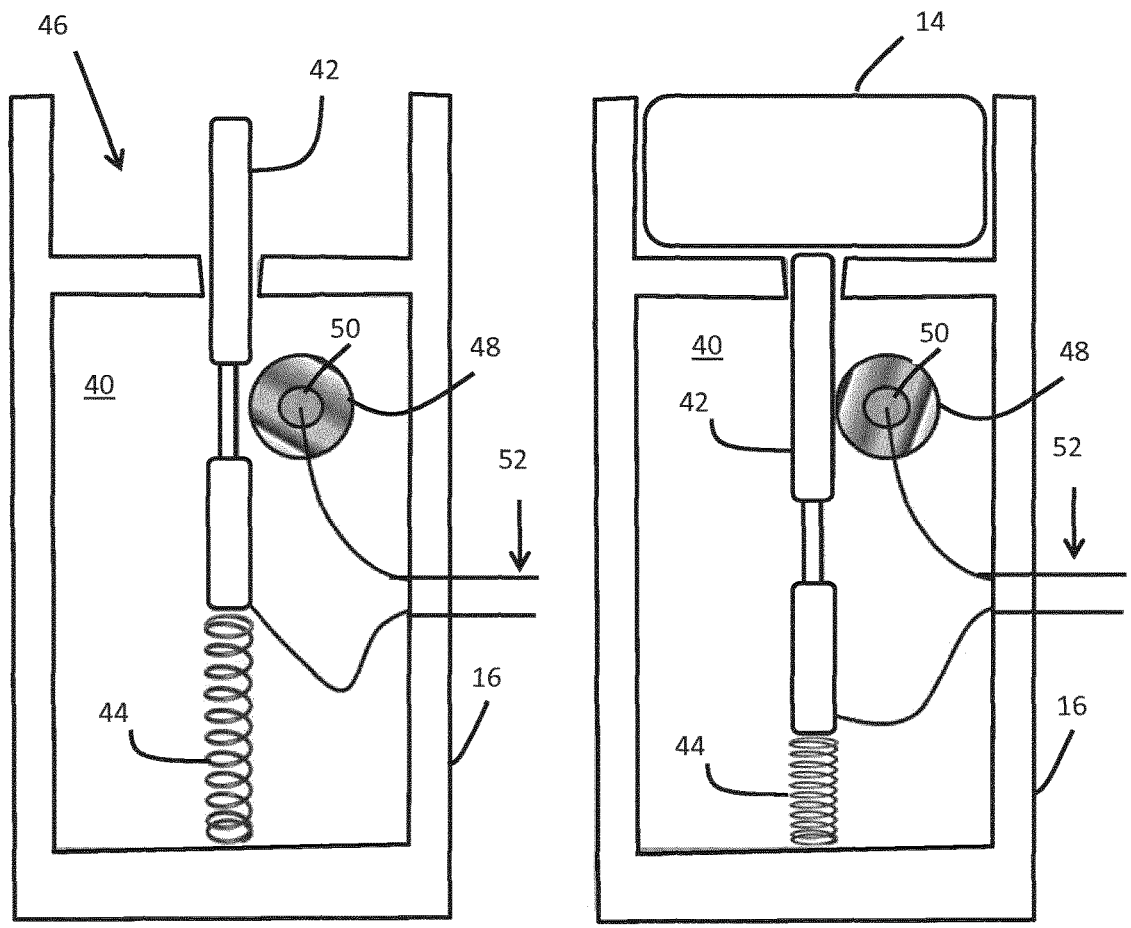
FIG. 2 shows a socket used in the system of FIG. 1.

FIG. 2 shows one example of a simple mechanical design for providing the required (near) random session identifier, which is and remains operational even if no power is applied to any part of the system.

The socket 16 comprises a closed or otherwise not regularly accessible chamber 40 which houses a detection arrangement for detecting connection of a plug to the socket.

The detection arrangement comprises a pin 42 which is biased upwardly by a spring 44. The top part of the pin 42 projects into a recess 46 which is for receiving the plug 14.

FIG. 2(*a*) shows the configuration with no plug present and FIG. 2(*b*) shows the configuration with a plug. The pin has larger diameter end sections and a smaller diameter middle section.

A roller 48 is driven to rotate by the larger diameter top section of the pin 42.

In the extended position of FIG. 2(*a*), the pin projects into the recess, and the smaller diameter part of the pin 42 is adjacent the roller 48. In this way, there is no contact between the pin and the roller.

When the pin is pushed into the chamber 40 by the application of the plug 14, the upper part of the pin engages with the roller and causes it to rotate. It adopts a final rotational position when the plug is fully inserted and this position is held.

When the plug is removed, the roller 48 is rotated again, and it may also rotate freely on its axis when the pin surface is released from the roller.

This arrangement aims to turn the roller 48 to an arbitrary position. In particular, a new position is adopted each time a plug is removed and then one is attached. The position may be made even more random, for example by using a spring jump mechanism to actively drive the rotation of the roller.

The pin 42 is electrically conductive. The roller also is electrically conductive, but with a resistance between a conductive inner axle 50 and points around the outer surface which varies as a function of position around the outer surface. This can for example be achieved with a single body formed of a material with non-uniform resistance over area, or with a set of discrete radially extending resistor elements. The axle and the pin form electrical contacts, and signal wires 52 connect to them. The resistance between these signal wires is thus dependent on the point of contact between the roller and the pin, and thus dependent on the roller angular position.

The signal wires allow the electrical resistance between them to be measured. There is no need for any power to be provided to the plug for this purpose. Instead, the resistance value can be interrogated by providing a voltage between the signal wires and measuring the current flowing, at the socket controller 12 (shown in FIG. 1).

When the plug is not connected to the socket, there is in this example an open circuit, which is a different resistance to any value that can arise when the plug is connected. Thus, the session identifier then has a value different to any possible value when the plug is connected to the socket.

The recess 46 surrounds the plug so that the pin 42 cannot easily be kept in place by tampering while the plug is being removed.

This design allows a near random electrical resistance value to be established between the signal lines 52 each time a plug is applied.

The session identifier may comprise a different impedance value, or indeed any analogue parameter value, which value is generated by the mechanical operation of connecting the plug to the socket.

An installation and usage scenario will now be outlined for use in a lighting system. In this case, the pluggable devices comprise lighting units and the socket controller is a lighting controller.

To install the system, the installer's installation client 30 reads the socket identifier and (optionally) lamp type identifier.

The installer then plugs the lamp in the socket and may validate its proper operation. When plugged in, the socket and/or lamp identifiers (such as bar codes) may become hidden for example if they are placed at the plug and socket sides.

The socket controller 12 becomes aware of the activity as a result of a changed session identifier associated with the socket, and sends the new session identifier to the installation client 30 along with the related socket controller identifier and socket identifier. In other arrangements, information could also be sent directly to the installation server 32.

The installer uses the installation client 30 using a Wi-Fi, GSM link or other network link to send the installer identifier, session identifier, socket identifier, socket controller identifier and (optionally) lamp type identifier to the installation server 32.

The installation server 32 receives all these different identifiers and keeps the information in a database, including the generated JoinID explained above, and optionally additionally generated security codes.

The lamp can then be used by the socket controller, which is its lighting controller. The socket controller will also detect when the lamp has been removed from the socket at any time, immediately or once power is reapplied to it. It can then provide a warning either at the socket controller, at the socket, or through a connected server. When the installation client 30 is connected to the system (e.g. for maintenance or periodic system authentication), the socket controller may also notify the installation client of the change in system configuration.

Note that the installer could be a person, but it could also be a machine. Most of the installation could also be a remotely supervised procedure after all lamps are plugged in, provided the required identifier readings and validations are available during the procedure.

There are various extensions and options for the system.

A plug session may last for an indeterminate period, such as when a lamp is installed in a socket. However, it may also be valid for a limited period, for example to restrict the use or wear of a device.

The session identifier may be used as part of a tracking system of an object in a network, or as part of a payment system for socket usage. In the latter case, the period during which a session identifier remains unaltered may be used as a basis for calculating payment. In particular, in the example shown, the session identifier changes both on insertion and removal of the plug. Thus the duration of a constant session identifier is matched to the time period during which a device remains plugged in.

Instead of a single plug, a group of plugs can be associated with a single session identifier by deploying a session mechanism that spans multiple sockets, for example a cascade of electrical resistances.

An auto-commissioning procedure may be initiated by a controller once it finds a different session identifier on any of its sockets. This auto-commissioning procedure may for example use coded light sensors to validate the identity or type of re-plugged lamps.

In the example above, the session identifier is purely mechanically generated. It may combine mechanical and electrical aspects. For example, additional electronics in the pluggable device (e.g. lamp) and socket, such as RFID tags, could be correlated to create an alternative or more complex session identifier which is unique to a particular combination.

Tampering could then be detected even if the mechanical session identifier is somehow unchanged but there is still a change in the overall session identifier as a result of the electronic identifier.

The session identifier (or JoinID) may be forwarded to the pluggable device if it is able to process such identification. This would enable the device to verify it is operating in a validated session. This could for example be used if the installation also involves calibration and usage approval of a device.

A pluggable device may serve as a token for certain location-bound usage rights if its owner is identified at the time the session is initiated by the plug event. In this case, the owner is acting as the installer. The owner is responsible for removing the pluggable device. The pluggable device itself might be mechanically constructed to fit only in specific sockets.

Once a controller detects a non-validated plug event, for example based on a change of a session identifier which is not part of the installation procedure, it may provide warning signals, for example blinking of a plugged lamp or a notification on the socket itself, until the installation is completed or validated.

A specific embodiment relevant for a system comprising a set of plugs and a plug controller is the following. When a plug is unplugged from a socket, the plug controller detects that the session identifier has changed. Alternatively the plug may register that it has been unplugged and subsequently plugged-in again when it is plugged in. The detection of a new session may result in alternate behavior. For example, the plug controller can change the status of the pluggable device such that the pluggable device will not work anymore when the device is inserted in a different socket (or in the same socket again). This can enable theft prevention of the pluggable device.

The invention is of interest for any network for which the installation is to be monitored. It is of particular interest for professional and consumer applications where security rules apply, for medical applications involving expensive or calibrated devices, and for lighting applications. In a lighting application (indoor or outdoor), the pluggable devices may be individual lamps, or luminaires, or other devices such as sensors.

In the case of a lighting system, the socket controller may be used for controlling other properties of the lighting units, not only the supply of power. It may control the light output color, intensity and evolution of lighting effects over time. It may also control components or functions used alongside lighting components, such as sensors.

Figure 3:
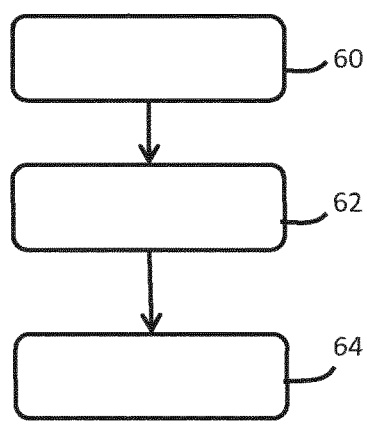
FIG. 3 shows a method in accordance with an example of the invention.

FIG. 3 shows a method in accordance with an example of the invention.

In step 60 a plug is connected to the socket.

In step 62, a session identifier is generated which identifies the session during which the plug remains connected to the socket, wherein a new session identifier is generated each time a plug is connected to the socket.

In step 64 the session identifier is monitored to determine when the plug has been unplugged from the socket.

The examples above have sockets which may provide power to a connected device. This is not essential. The devices may be powered locally, or by harvesting energy, such as solar energy, or they may not require power.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a

The invention claimed is:

1. A system for monitoring the connection of a plug of a lighting unit to a socket, the system comprising:
 at least one socket for receiving the plug of a lighting unit, the at least one socket comprising:
  a detection arrangement for detecting connection of the plug to the socket, wherein the detection arrangement is adapted to generate a session identifier which identifies the session during which the plug remains connected to the socket, wherein the detection arrangement is adapted to generate a new session identifier each time the plug is connected to the socket; and
  a lighting controller adapted to store and/or monitor the session identifier to enable determination that the plug has been unplugged from the socket, wherein the session identifier comprises an analogue parameter value based on a variable impedance, which value is generated by mechanical movement of one or more components of the detection arrangement in response to the mechanical operation of connecting the plug to the socket.

2. A system as claimed in claim 1, wherein the socket is a power socket, and wherein the session identifier remains valid with or without power provided to the socket.

3. A system as claimed in claim 1, wherein the detection arrangement comprises a rotatable disc having different resistances between the center and different circumferential positions around the disc, wherein connection of a plug to the socket causes the disc to rotate and then be locked in position, and the session identifier is based on a resistance which includes one of the different resistances.

4. A system as claimed in claim 1, wherein when the plug is not connected to the socket, the session identifier has a value different to any possible value when the plug is connected to the socket.

5. A system as claimed in claim 1, wherein the socket comprises a control pin which sits in a recess, and is spring-biased such that it projects from a base of the socket when a plug is disconnected from the socket, and is pushed into a recessed state when covered by the plug.

6. A system as claimed in claim 1, wherein the lighting controller is additionally adapted to control the supply of power to the socket.

7. A system as claimed in claim 1, wherein there is a plurality of sockets, each having a unique identifier and wherein optionally there is a plurality of lighting controllers, each having a unique identifier.

8. A system as claimed in claim 1, further comprising a system controller, which is adapted to store, for each connection of the plug to a socket within the system:
 the unique identifier of the socket;
 optionally, a unique identifier of the lighting controller; and
 the session identifier.

9. A system as claimed in claim 8, wherein the system controller is further adapted to generate a connection identification which is a function of the unique identifier of the socket, optionally the unique identifier of the controller, and the session identifier.

10. A method of monitoring the connection of a plug of a lighting device to a socket, the method comprising: in response to connection of the plug to the socket, generating, by a detection arrangement comprised in the socket, a session identifier which identifies the session during which the plug remains connected to the socket, wherein a new session identifier is generated each time a plug is connected to the socket; and storing and/or monitoring, by a lighting controller, the session identifier to determine that the plug has been unplugged from the socket, wherein the session identifier comprises an analogue parameter value based on a variable impedance, which value is generated by mechanical movement of one or more components of the detection arrangement in response to the mechanical operation of connecting the plug to the socket.

* * * * *